United States Patent Office 2,786,009
Patented Mar. 19, 1957

2,786,009

INSECTICIDAL COMPOSITIONS COMPRISING CARBONYL BISDITHIOPHOSPHATE COMPOUNDS AND METHOD OF APPLYING THE SAME

John A. Pianfetti, Charleston, and Oren F. Williams and James Forrest Allen, South Charleston, W. Va., assignors to Food Machinery and Chemical Corporation, New York, N. Y., a corporation of Delaware No Drawing. Application September 4, 1953, Serial No. 378,682

5 Claims. (Cl. 167—22)

This invention relates to pesticidal compositions, and more particularly to acaricides and insecticides.

The compounds which we have found to be particularly effective in these pesticidal preparations have the following general formula:

$$(RO)_2P(S)S—CO—SP(S)(OR)_2$$

wherein the R group may in general be any unsubstituted or substituted aliphatic or aromatic radical.

The methods for the preparation of these compounds may be found in the literature, as for example U. S. Patent 2,434,357. The method of preparation of these compounds forms no part of the present invention.

However, in general, the compounds may be readily prepared by reacting phosgene with the salts of secondary esters of dithiophosphoric acids according to the following equation:

$$2(RO)_2P(S)SM + COCl_2 = 2MCl + (RO)_2P(S)S—CO—SP(S)(OR)_2$$

wherein M represents any suitable metal ion, such as sodium or potassium, or an ammonium or substituted ammonium ion derived from an amine, such as the $Et_3NH^+$ ion derived from triethylamine. The salt $$(RO)_2P(S)SM$$

is prepared by neutralizing with the appropriate base the acid resulting from heating together the theoretical quantities of phosphorus pentasulfide and the alcohol or phenol corresponding to the group R. The equation for this reaction is as follows:

$$P_2S_5 + 4ROH = 2(RO)_2P(S)SH + H_2S$$

A typical preparation is set forth in the following example:

EXAMPLE

*Preparation of tetraallyl carbonyl bisdithiophosphate*

In a 500 ml. 3-neck flask equipped with a stirrer, dropping funnel and an adaptor bearing a Dry Ice condenser and a thermometer was placed 200 ml. of anhydrous ether and 62 g. (0.2 mole) of triethylammonium diallyl dithiophosphate. By means of a Dry Ice condenser placed on top of the dropping funnel, 10 g. of phosgene was liquefied and then gradually added to the contents of the flask at 0–10° C. The mixture was stirred at room temperature overnight, filtered to remove the amine salt, and the ether then removed in vacuo. The product, tetraallyl carbonyl bisdithiophosphate, a light brown viscous liquid, was obtained in 81% yield (36 g.).

Analysis.—Calcd. for $C_{13}H_{20}O_5P_2S_4$: P, 13.9%; S, 28.8%. Found: P, 14.1%; S, 24.8%.

The most biologically active compounds of the type set forth in the general formula above appear to be those in which R is a relatively small alkyl or substituted alkyl radical, of about 1 to 3 carbon atoms. Among these, the greatest activity toward certain pests is exhibited when the R group is the isopropyl radical.

Additional examples of compounds of this type which have been found to have pronounced pesticidal activity are set forth in Table 1.

TABLE 1.—CARBONYL BISDITHIOPHOSPHATES

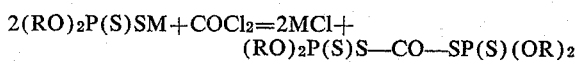

| R | Name |
|---|------|
| $C_2H_5—$ | Tetraethyl Carbonyl Bisdithiophosphate. |
| $ClCH_2CH_2—$ | Tetrakis-2-Chloroethyl Carbonyl Bisdithiophosphate. |
| $ClH·H_2NCH_2CH_2—$ | Tetrakis-2-aminoethyl Carbonyl Bisdithiophosphate tetrahydrochloride. |
| $n—C_3H_7—$ | Tetra-n-propyl Carbonyl Bisdithiophosphate. |
| $iso—C_3H_7—$ | Tetraisopropyl Carbonyl Bisdithiophosphate. |
| $CH_2=CHCH_2—$ | Tetraallyl Carbonyl Bisdithiophosphate. |
| 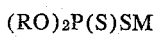 | Tetrakisdichloroisopropyl Carbonyl Bisdithiophosphate. |
|  | Tetrakis-1-carbethoxyethyl Carbonyl Bisdithiophosphate. |
| $CH_3\overset{O}{C}—OCH_2CH_2—$ | Tetrakis-2-acetoxyethyl Carbonyl Bisdithiophosphate. |
| $C_6H_5OCH_2CH_2—$ | Tetrakis-2-phenoxyethyl Carbonyl Bisdithiophosphate. |
| $C_6H_5—$ | Tetraphenyl Carbonyl Bisdithiophosphate. |
| $CH_3OC_2H_4OC_2H_4—$ | Tetrakis-2-(2-methoxyethoxy)ethyl Carbonyl Bisdithiophosphate. |
| Mixed—$C_{13}H_{27}—$ | Tetratridecyl Carbonyl Bisdithiophosphate. |

Table 2 shows the pesticidal activities of two of the preferred compounds which are used as the toxic ingredient in the compositions of the present invention. The products were formulated as 15% wettable powders and sprayed on plants infested with mites or aphids. The mortality counts, shown in the table as the percent killed, were taken at intervals of 3 to 6 days after application.

TABLE 2.—PESTICIDAL ACTIVITIES

| R | P. p. m. | 2-Spotted Mite | Pea Aphid |
|---|---|---|---|
| $C_2H_5$ | 1,250 | 100 | 35 |
|  | 156 | 100 |  |
|  | 78 | 100 |  |
|  | 39 | 100 |  |
|  | 20 | 95 |  |
| $(CH_3)_2CH$ | 1,250 | 100 | 100 |
|  | 156 | 100 | 83 |
|  | 78 | 100 | 40 |
|  | 39 | 98 | 0 |
|  | 20 | 10 |  |

The compounds of this invention are most suitably employed in the form of sprays, such as aqueous dispersions or dust compositions.

Since the compounds employed in the preparations of this invention are insoluble or only slightly soluble in water, it is preferable to use them admixed with wetting or emulsifying agents so as to obtain uniformity and stability of dispersion. The use of wetting agents in the aqueous dispersions also facilitates the spreading action of the spray, resulting in better contact with the surface being treated, and consequently effecting better contact with the pest.

The concentration of the active ingredient in the aqueous dispersions or dust compositions varies with the particular conditions encountered and with the pests to be destroyed.

Any of the conventional dispersing, wetting or spreading agents may be employed in the preparation of aqueous dispersions. Inert solid carriers such as talc, pumice, silica, silicates, chalk, wood flour and clays such as fuller's earth, china clay, kaolin or bentonite may be employed in the prepartion of the dusting compositions. The liquid dispersions may be made up with liquids other than water, and the composition may contain other active ingredients as well as other inert carrier agents.

From consideration of the foregoing disclosure, including the examples and other illustrative material therein set forth, it will be obvious to those skilled in the art that the teachings of this invention may be utilized in other forms, all of which may be considered to fall within the scope of the claims below.

That which is claimed as new is:

1. An insecticidal composition comprising a carbonyl bisdithiophosphate having the general formula:

$$(RO)_2P(S)S-CO-SP(S)(OR)_2$$

wherein R is selected from the group consisting of alkyl and alkenyl radicals containing a maximum of 13 carbon atoms, the phenyl radical, aliphatic ester radicals containing a maximum of 5 carbon atoms, aliphatic ether radicals containing a maximum of 5 carbon atoms, halogen substituted alkyl radicals, amino substituted alkyl radicals and phenoxy substituted alkyl radicals, said alkyl radicals containing a maximum of 3 carbon atoms; and an insecticidal adjuvant comprising water containing a surface active agent.

2. The composition of claim 1, wherein R is ethyl.
3. The composition of claim 1, wherein R is isopropyl.
4. The composition of claim 1 wherein R is allyl.
5. A method of exterminating insects and acarids which comprises applying to insects and acarids and their habitats a toxic amount of a composition comprising a carbonyl bisdithiophosphate having the general formula:

$$(RO)_2P(S)-CO-SP(S)(OR)_2$$

wherein R is selected from the group consisting of alkyl and alkenyl radicals containing a maximum of 13 carbon atoms, the phenyl radical, aliphatic ester radicals containing a maximum of 5 carbon atoms, aliphatic ether radicals containing a maximum of 5 carbon atoms, halogen substituted alkyl radicals, amino substituted alkyl radicals, and phenoxy substituted alkyl radicals, said alkyl radicals containing a maximum of 3 carbon atoms.

References Cited in the file of this patent
UNITED STATES PATENTS

| | | |
|---|---|---|
| 2,063,629 | Salzberg et al. | Dec. 8, 1936 |
| 2,434,357 | Fischer | Jan. 13, 1948 |